May 11, 1971  D. N. MARTIN  3,578,412

AUTOMATED TRANSPORT SYSTEM

Filed Jan. 22, 1968

DONALD N. MARTIN
*INVENTOR.*

BY *Paul L. Harder*

ATTORNEY

United States Patent Office 3,578,412
Patented May 11, 1971

3,578,412
AUTOMATED TRANSPORT SYSTEM
Donald N. Martin, Whittier, Calif., assignor to
Beckman Instruments, Inc.
Filed Jan. 22, 1968, Ser. No. 699,617
Int. Cl. G01n *1/10;* B65g *47/00*
U.S. Cl. 23—259                                    15 Claims

ABSTRACT OF THE DISCLOSURE

A transport system for use in an automated chemical analyzer having a pair of horizontal rails on which a plurality of individual sample capsules are adapted to be supporter and conveyed by means of a pair of serrated members or racks, in intermittent stop and go fashion, past a series of processing stations where various analytical steps are performed, the rails being mounted for up and down movement by means of a vertical air cylinder, the racks being mounted for reciprocal horizontal movement by a horizontal air cylinder, the action of rails and racks being synchronized or coordinated so that a capsule on the rails in the down position thereof is disposed in engagement with a pair of teeth on the racks which then slides the capsule along the rails a distance equal to about the width of a capsule, after which the vertical air cylinder is triggered to raise the rails and trigger return of the racks, each cycled downward movement of the rails engaging the capsule with the next downstream pair of teeth of the racks during each succeeding cycle and in such manner conveying the capsule the length of the rails.

---

This application is related to application Ser. No. 699,-698 filed concurrently herewith for Automated Chemical Analyzer by Jerry E. Rochte et al., now U.S. Pat. No. 3,523,442.

The present invention relates to automated wet chemical or clinical analyzers and more particularly to a transport system forming part of such an analyzer for conveying individual sample containers or capsules in stop and go fashion past a series of processing stations where various analytical steps are performed.

Present day development of automated apparatus for clinically processing and analyzing samples of biological fluids has led to the development of apparatus of the type which employs conveying means to carry an array of test tubes or other form of containers to processing stations where various operational steps are performed, and employ rotary turntables and/or conveying belts or chains to transport the samples. Re-use of the sample containers requires a careful cleansing and involves the attendant danger of a cross contamination. Moreover, with the use of belt or chain drive, errors in positionable tolerances accumulate which makes for the sample containers being out of proper positioning or registry at the processing stations later in the analytical process.

It is, therefore, an object of the present invention to provide a transport system which obviates the positional tolerances of belt or chain drive and thereby eliminates the cumulative errors inherent therein.

Another object is the provision of a transport system by which processing steps may be triggered by vertical movement of the capsule, thereby obviating the need for dipping probes at some of the processing stations.

A further object is to provide a sample capsule transport system which is of simple construction and operates in a facile and reliable manner and positions the sample capsule at the processing station in proper position for proper performance of the processing step associated therewith.

For the achievement of the aforementioned and other objects and advantages, the present invention contemplates and is concerned with a sample capsule transport system having a pair of horizontal rails on which the capsule is conveyed in a stop and go fashion, the rails being supported on a frame mounted for reciprocal vertical movement by a vertical air cylinder, the action of which is coordinated with a horizontally reciprocal pair of racks having teeth received by the capsule, the coordinated action being that the down position of the rails places the capsule in engagement with the teeth of the racks, whereupon the racks move horizontally the distance of one capsule width and the rails are then raised freeing the capsule from the racks, after which the racks return to their original position. The next downward movement of the rails places the capsule in engagement with the next downstream pair of teeth on the racks which then move the capsule downstream one capsule width, and so on.

Other objects, advantages and features of the present invention will become better understood by reference to the following description when considered in connection with the accompanying drawing wherein.

Figure 1:
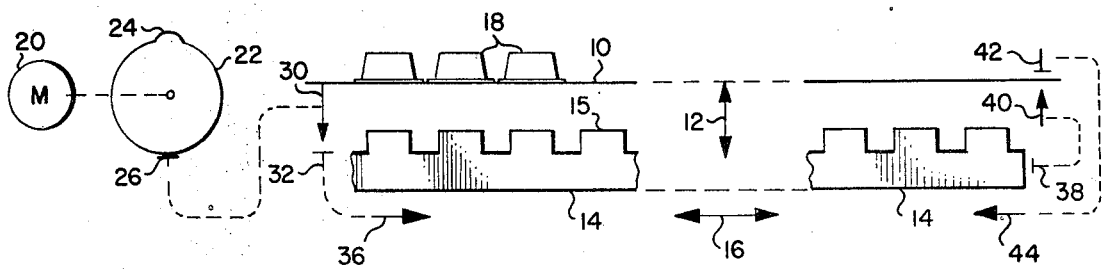
FIG. 1 is a diagram schematically illustrating a transport system embodying the principles of the present invention.
Figure 2:
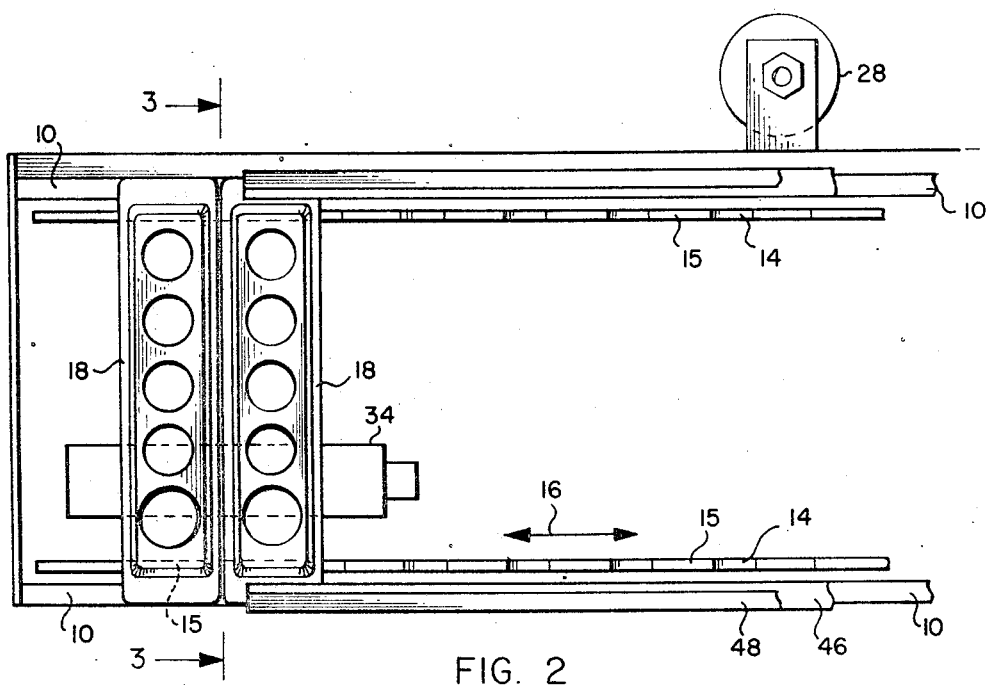
FIG. 2 is a fragmentary plan view of the transport system showing the essential features thereof.
Figure 3:
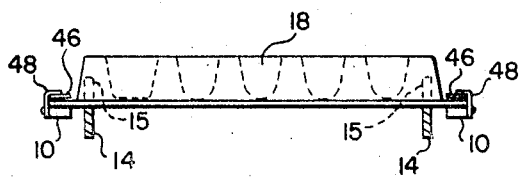
FIG. 3 is a sectional view taken generally along line 3—3 of FIG. 2, with parts omitted.
Figure 4:
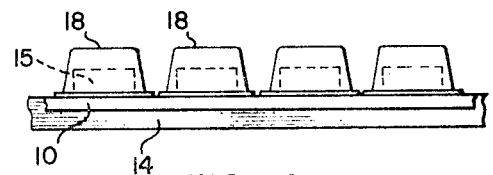
FIG. 4 is a fragmentary side elevation showing the relationship between the rails, the racks and the capsules when the rails are in the down position.

Referring now to the drawing, there is shown in FIG. 1 a diagram schematically illustrating a sample capsule transport system embodying the principles of the present invention. Directing attention also to FIGS. 2 and 3, the system essentially includes a pair of parallel supports or rails 10, generally horizontally disposed and supported for reciprocal vertical movement, as indicated by the double-headed vertical arrow 12 in FIG. 1, and a pair of parallel racks 14 with projections or teeth 15, the racks also generally horizontally disposed but supported for reciprocal horizontal movement, as indicated by the double-headed horizontal arrow 16. The rails 10 and the racks 14 are adapted to be moved periodically in synchronism for the purpose of advancing or transporting sample capsules 18 along the rails in a stop and go fashion for the performance of process steps at stations downstream (not shown) in the analysis of a sample contained in each of the capsules. Vertical movement of the rails 10 is initiated by starting a timer which may take the form of a motor 20 conveniently coupled to a rotatable cam 22 formed with a camming projection 24 for actuating a trigger 26 periodically, for instance, once every 60 seconds. Trigger 26 controls the downward action of a vertical air cylinder 28, FIG. 2, for moving the rails 10 down a distance, represented by the arrow 30 in FIG. 1, so that the capsule supported on the rails is disposed over and is engaged by a pair of teeth 15, one on each of the racks 14, as shown in phantom in FIGS. 3 and 4. Upon reaching their lower position, the rails actuate a trigger 32 which controls the action of a horizontal air cylinder 34, FIG. 2, for moving the racks 14 to the right a distance, represented by the arrow 36, equal to about the width of the capsule 18, following which a trigger 38 is actuated. Trigger 38 controls the upward action of the air cylinder 28 for moving the rails back up, as indicated by arrow 40 in FIG. 1, to their upper position, in which the rails and capsules thereon are above and clear of the tops of the teeth 15 and a trigger 42 is actuated. Trigger 42 controls the action of the air cylinder 34 for returning the racks in the direction of arrow 44 in FIG. 1 and completing a cycle.

Retainer members 48 fixed to the sides of the rails 10 serve as guides for guiding the capsules 18 for movement along a straight path in a horizontal direction parallel to the racks 14. Strips 46 of flexible material, for example silicone rubber, may be provided for each rail and retained thereon by retainer members 48 to hold the capsules 18 down on the rails 10.

Figure 5:
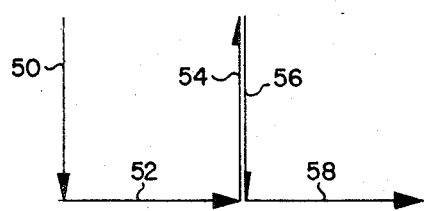
FIG. 5 is a schematic diagram illustrating the path of movement followed by a sampe capsule during transport thereof by the transport system of the present invention.

Accordingly, as seen in FIG. 5, the movement of each capsule during operation of the transport system is as follows: down, arrow 50, engaging teeth 15; over, arrow 52, a distance about the width of the caspule; up, half-arrow 54, clear of the teeth 15; a dwell constituting the major portion of the periodic cycle, until the rails are triggered; then down, half-arrow 56, engaging teeth 15; over, arrow 58, one capsule width, etc.

For a clearer understanding of the use of the transport system of the present invention in the environment of an automated clinical analyzer and its relation to other components thereof, reference may be had to the aforementioned application Ser. No. 699,618.

It will be appreciated, of course, that the principles of the present invention could be applied to capsule supports and capsule movement means for conveying or transporting the capsules along a curved path rather than linearly.

There has thus been provided a sample capsule transport system which is simple in construction and operates reliably in a rapid and facile manner to position the capsules properly at the various processing stations.

Although the present invention has been described in detail in connection with one illustrative embodiment, it should be understood that the novelty thereof is not limited to the specific embodiment illustrated and described but is defined only by the scope of the appended claims.

What is claimed is:

1. A transport system for transporting discrete articles comprising, in combination:
   article engaging means mounted for reciprocal travel generally along a path of movement;
   support means embodying means for guiding articles for movement therealong in generally the same direction as said path, said support means being movable between a first position in which the articles thereon are disengaged from said article engaging means and a second position adjacent to said article engaging means in which said articles are engageable by said article engaging means; and
   means for periodically moving said support means from said first position to said second position and for shifting said article engaging means when said support means is in said second position to move said articles along said support means.

2. The system of claim 1 wherein:
   said path of movement of said article engaging means is generally horizontal;
   said support means is movable vertically; and
   said article engaging means and said support means are reciprocal between predetermined limits.

3. The system of claim 1 wherein:
   said support means comprise a pair of parallel rails extending in generally the same direction as said path; and
   said article engaging means comprise serrated means.

4. The system of claim 3 wherein:
   each of said articles is of predetermined depth and width, the latter extending lengthwise of said rails; and
   said serrated means comprise teeth engageable with said articles when said support means is in said second position.

5. The system of claim 4 wherein:
   said rails have predetermined limits of movement the extent of which is slightly greater than said depth of said articles;
   said teeth have predetermined limits of movement the extent of which is equal to about said width of said article; and
   whereby said article is moved along said rails about one article width when movement is imparted thereto.

6. A transport system for use in an automated chemical analyzer for moving sample capsules past a series of processing stations in stop and go fashion comprising, in combination:
   capsule engaging means mounted for generally horizontal reciprocal movement;
   capsule support means adapted to support capsules for movement therealong in generally the same direction of movement of said capsule engaging means, said support means being mounted for generally vertical reciprocal movement and movable from a first position remote from said capsule engaging means to a second position in which said capsules are engageable by said capsule engaging means; and
   means for moving said capsule support means from said first position to said second position in which said capsule engaging means are engageable with said capsules and for actuating said capsule engaging means when said support means is in said second position to move said capsules along said support means.

7. The system of claim 6 wherein:
   said capsule support means comprise a pair of generally horizontally disposed parallel rails;
   each of said capsules is of elongated body construction having a width extending lengthwise of said rails and end portions resting thereon; and
   said capsule engaging means comprise teeth engageable with said body of said capsule.

8. The system of claim 7 wherein said rails have limits of reciprocal vertical movement such as to place said capsules into engagement with said teeth and out of such engagement, in alternation; and
   said teeth have limits of reciprocal horizontal movement equal to about said width of said capsule.

9. The system of claim 7 wherein:
   said rails are provided with resilient retaining means engageable with said end portions for holding said capsules thereon.

10. The system of claim 8 wherein:
   said body of said capsule is hollow; and
   said teeth are less than said width of said capsule and receivable therein.

11. The system of claim 8 wherein:
   said rails and teeth are moved by pneumatic means.

12. A method of transporting a plurality of sample capsules past a series of processing stations comprising the steps of:
   supporting said capsules for movement along a generally horizontal path;
   lowering all of said capsules simultaneously to a second path extending in generally the same direction as said first-mentioned path;
   imparting movement to all of said capsules simultaneously along said second path; and
   raising all of said capsules simultaneously to said first-mentioned path.

13. The method of claim 12 wherein:
   said raising of said capsules places at least one of said capsules into operative relation with respect to at least one of said processing stations.

14. A method of transporting a plurality of sample capsules past a series of processing stations comprising the steps of:

positioning said capsules on a generally horizontal support for movement therealong;

providing generally horizontally movable capsule engaging means spaced from said support;

shifting said support adjacent to said capsule engaging means so that the latter engages said capsules;

shifting said capsule engaging means in one direction to move said capsules along said support; and shifting said support away from said capsule engaging means to disengage said capsules therefrom.

15. The method of claim 14 including the additional steps of:

shifting said capsule engaging means in the direction opposite to said one direction after shifting said support away from said capsule engaging means; and thereafter repeating said shifting steps in the sequence stated.

References Cited
UNITED STATES PATENTS

| | | | |
|---|---|---|---|
| 3,036,893 | 5/1962 | Matelson | 23—253X |
| 3,252,763 | 5/1966 | Durrum et al. | 23—253 |
| 3,143,393 | 8/1964 | De Seguin Des Hons | 23—259X |
| 3,327,535 | 6/1967 | Sequeira | 23—259X |
| 3,487,862 | 6/1967 | Soderblom | 23—259X |

MORRIS O. WOLK, Primary Examiner

R. E. SERWIN, Assistant Examiner

U.S. Cl. X.R.

23—253; 141—130, 232; 198—19, 20